(12) United States Patent
Thea et al.

(10) Patent No.: US 10,317,132 B2
(45) Date of Patent: Jun. 11, 2019

(54) SMART TIMER FOR REFRIGERATORS AND SIMILAR APPLIANCES

(71) Applicant: United Electrical Systems LLC, Clifton, NJ (US)

(72) Inventors: William Thea, Upper Saddle River, NJ (US); Maximilian Linder, Phillipsburg, NJ (US); Dario Bianco, Basking Ridge, NJ (US); Joel Thea, New York, NY (US)

(73) Assignee: UNITED ELECTRICAL SYSTEMS, LLC, Clifton, NJ (US)

( * ) Notice: Subject to any disclaimer, the term of this patent is extended or adjusted under 35 U.S.C. 154(b) by 35 days.

(21) Appl. No.: 15/281,256

(22) Filed: Sep. 30, 2016

(65) Prior Publication Data
US 2017/0097187 A1 Apr. 6, 2017

Related U.S. Application Data

(60) Provisional application No. 62/235,663, filed on Oct. 1, 2015.

(51) Int. Cl.
F25D 29/00 (2006.01)
F25D 27/00 (2006.01)
(Continued)

(52) U.S. Cl.
CPC ........... *F25D 29/00* (2013.01); *F25D 27/005* (2013.01); *F25D 29/008* (2013.01);
(Continued)

(58) Field of Classification Search
CPC ...... F25D 29/00; F25D 29/008; F25D 27/005; F25D 2600/02; F25D 2600/06;
(Continued)

(56) References Cited

U.S. PATENT DOCUMENTS

| 3,980,980 A | 9/1976 | Zioni et al. |
| 4,031,435 A | 6/1977 | Zioni et al. |

(Continued)

FOREIGN PATENT DOCUMENTS

| CN | 201589491 U | 9/2010 |
| CN | 103411383 A | 11/2013 |

(Continued)

OTHER PUBLICATIONS

International Search Report and the Written Opinion, PCT/US2016/054610, dated Jan. 24, 2017, 9 pages.

*Primary Examiner* — Kenneth M Lo
*Assistant Examiner* — Istiaque Ahmed
(74) *Attorney, Agent, or Firm* — Edell, Shapiro & Finnan, LLC

(57) ABSTRACT

In order to permit use of a refrigerator by observant Jews during Holiday times, Normal and Holiday modes are established. During Holiday mode, repetitive fixed frequency and fixed duty cycle time cycles are established, each time cycle having "on" and "off" portions. During "on" cycle portions current flow through the refrigerator is permitted as determined by the refrigerator compartment temperature. During "off" cycle portions current flow is inhibited irrespective of refrigerator compartment temperature changes. Visible indicators inform users of the status of the current cycle portion, thereby advising them to open the refrigerator door only during "off" cycle portions.

12 Claims, 17 Drawing Sheets

(51) Int. Cl.
*G05B 19/042* (2006.01)
*H02J 3/14* (2006.01)

(52) U.S. Cl.
CPC ............ *G05B 19/0426* (2013.01); *H02J 3/14* (2013.01); *F25D 2400/36* (2013.01); *F25D 2600/02* (2013.01); *F25D 2600/06* (2013.01); *G05B 2219/25419* (2013.01); *G05B 2219/2654* (2013.01); *H02J 2003/143* (2013.01)

(58) Field of Classification Search
CPC ... F25D 2400/36; H02J 3/14; H02J 2003/143; G05B 19/0426; G05B 2219/2654; G05B 2219/25419
See application file for complete search history.

(56) References Cited

U.S. PATENT DOCUMENTS

| | | | |
|---|---|---|---|
| 4,375,583 A | 3/1983 | Halperin et al. | |
| 4,506,120 A | 3/1985 | Fleischman | |
| 5,086,385 A | 2/1992 | Launey et al. | |
| 5,808,278 A * | 9/1998 | Moon | A47G 33/00 200/43.01 |
| 5,902,352 A | 5/1999 | Chou et al. | |
| 6,011,755 A | 1/2000 | Mulhall et al. | |
| 6,066,837 A | 5/2000 | McCormick et al. | |
| 6,473,661 B1 | 10/2002 | Wollner | |
| 6,703,591 B2 | 3/2004 | Daum et al. | |
| 6,965,801 B2 | 11/2005 | Hall | |
| 7,310,559 B2 | 12/2007 | Walko, Jr. | |
| 7,386,424 B2 | 6/2008 | DeBoer et al. | |
| 7,872,576 B2 | 1/2011 | Kalatizadeh | |
| 7,970,264 B2 | 6/2011 | Grossbach et al. | |
| 8,067,706 B2 | 11/2011 | Tukachinsky | |
| 8,390,204 B1 | 3/2013 | Zagha | |
| 9,024,545 B2 | 5/2015 | Bloch et al. | |
| 2005/0133353 A1 | 6/2005 | Whitman | |
| 2006/0074497 A1 | 4/2006 | Pollin | |
| 2007/0261561 A1 | 11/2007 | Grossbach et al. | |
| 2007/0277799 A1 | 12/2007 | Claesson et al. | |
| 2009/0167098 A1* | 7/2009 | Kalatizadeh | H03K 17/94 307/116 |
| 2009/0218957 A1 | 9/2009 | Kraft et al. | |
| 2009/0254831 A1 | 10/2009 | Dolny et al. | |
| 2010/0084996 A1 | 4/2010 | Van De Sluis et al. | |
| 2011/0014932 A1 | 1/2011 | Estevez | |
| 2011/0170379 A1 | 7/2011 | Eylon-Azoulay | |
| 2012/0181266 A1* | 7/2012 | Frommer | F24C 3/12 219/492 |
| 2012/0223661 A1* | 9/2012 | Bloch | H05B 37/0281 315/360 |
| 2014/0166447 A1 | 6/2014 | Thea et al. | |
| 2014/0327501 A1 | 11/2014 | Cohen | |

FOREIGN PATENT DOCUMENTS

| | | |
|---|---|---|
| CN | 203893570 U | 10/2014 |
| WO | 2011072515 A1 | 6/2011 |
| WO | WO2017/036555 A1 * | 3/2017 |

* cited by examiner

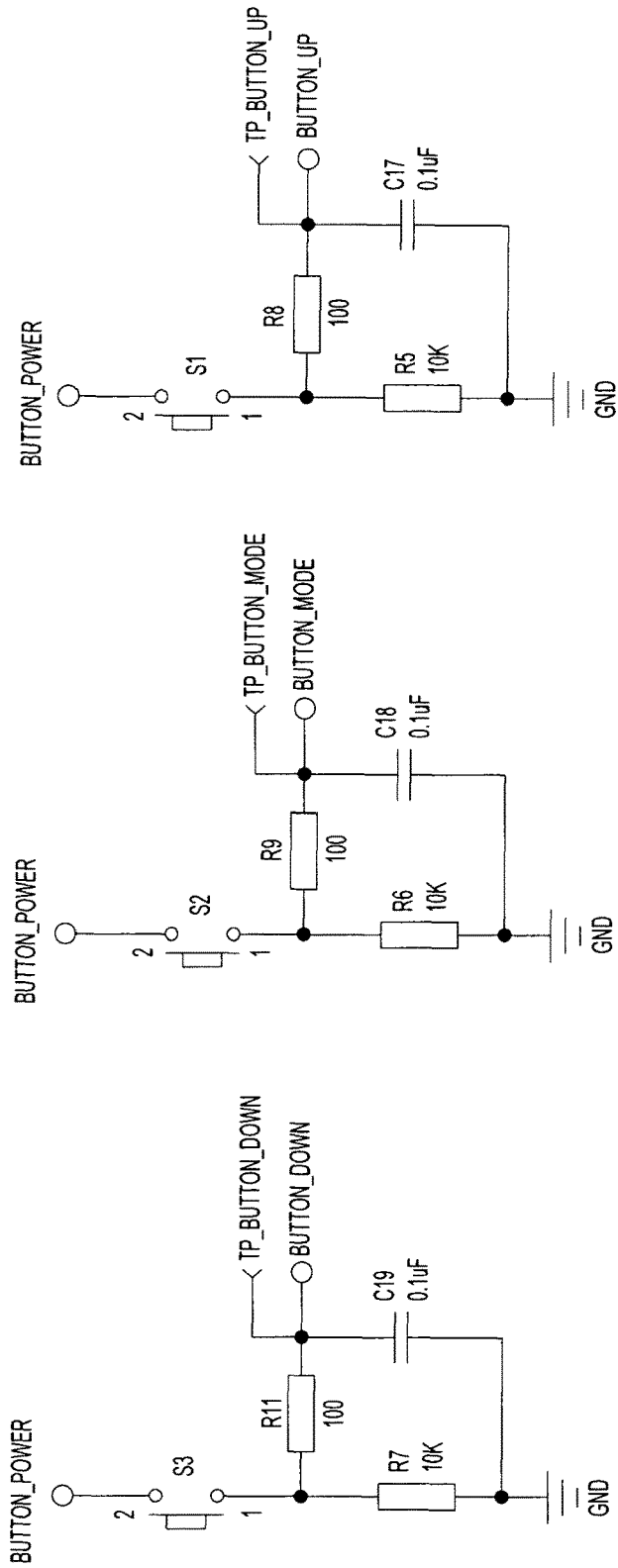

SMART TIMER FOR REFRIGERATORS AND SIMILAR APPLIANCES

CROSS REFERENCE TO RELATED APPLICATIONS

The present application is a non-provisional application based on and claiming priority from U.S. Provisional Application No. 62/235,663, entitled "Smart Timer For Refrigerators and Similar Appliances" filed Oct. 1, 2015, the disclosure of which is hereby incorporated herein by reference in its entirety.

FIELD OF THE INVENTION

The present invention broadly pertains to a method and apparatus for preventing initiation and termination of current flow through an electrical circuit during proscribed times. More particularly, the invention pertains to preventing actions by a person using an electrical appliance (e.g., a refrigerator or freezer) during predetermined time periods (such as religious holidays) from changing the state of current flow through that appliance.

BACKGROUND OF THE INVENTION

The preferred embodiment of the invention as described and disclosed herein is intended for use by observant Jews who are not permitted, for example, to directly or indirectly cause changes in electric current flow during the Sabbath and specified holidays. It will be understood, however, that the principles of the invention apply to any situation in which it is required that activity by a person or persons must be prevented from directly or indirectly causing current flow change.

In U.S. Pat. No. 9,024,545 (Bloch et al) there is disclosed a system for automatically preventing the manual actuation of an electrical switch in an electrical circuit from causing a change in current flow through that circuit during Sabbath and holiday times. The disclosure in the Bloch et al patent is incorporated herein by reference in its entirety. The present invention incorporates some of the principles and features of the inventions described in the Bloch et al patent. Specifically, Bloch et al disclose apparatus and methods that function to utilize date, time and geographic location data combined with electronic and/or mechanical devices to enable a control system to operate apparatus in accordance with Orthodox Jewish law, in particular by utilizing religious reference times that are calculated from the positional relationship of the sun and moon to the apparatus's specific geographic location. For example, although Boston, Mass. and Grand Rapids, Mich. are in the same eastern U.S. time zone, because of the east-west distance between them they experience sundown at different times. The stored data is thus specific to the location of the system so that sundown (and other such times of religious observance significance) is accurately established for that location. A timer system accesses data from a Jewish calendar to determine Gregorian calendar dates and times of specified Jewish events (e.g., Sabbath, holidays, prayer times, etc.), which data may be stored in the timer system or retrieved as needed from a remote location. The timer system similarly accesses data representing the time of year, time of day and the geographic location of the electrical circuit, which data may be internally stored or remotely retrieved. From this data the system establishes a normal operating mode in which an on/off switch is permitted to effect current changes in the circuit, and a holiday (including Sabbath) operating mode in which the state of circuit current flow existing at the time of holiday mode initiation is maintained for the entire holiday/Sabbath, irrespective of manual actuation of the on/off switch. The data for determining the various event dates and times may be stored in the timer system along with data representing the geographic location of the user's system. Geographic location data may be entered by the system user or determined by access to a Global Positioning System (GPS). From the location data the requisite times of day (e.g., sunrise, sunset) for effecting mode operations may be accessed from a lookup table stored in the timer system or may be computed pursuant to established algorithms.

When the electrical appliance to be controlled is a refrigerator, freezer, or other appliance in which current changes must occur in order to maintain the appliance functional, the prevention of manually initiated current change during proscribed times presents a somewhat different issue. Specifically, proper refrigerator operation requires the compressor motor to be turned on and off at different times to maintain the temperature of the contents of the refrigerator within the prescribed temperature ranges necessary to prevent the contained food from spoiling. This on/off operation is typically controlled as a function of the temperature sensed inside the food storage compartment. When a refrigerator door is opened, the inrush of warm air from the ambient environment changes the temperature inside the unit and thereby affects the timing of the on/off operation of the compressor motor and its use of electric current. For observant Jews the change of current flow resulting from the door opening, even if the actual current flow change is delayed until the sensed interior temperature rises sufficiently to a threshold temperature after the door is closed, would be a violation of Jewish law. It is an object of the invention to provide a method and apparatus that prevents such violation.

SUMMARY OF THE INVENTION

The present invention provides a system whereby Orthodox and other observant Jews can conveniently use a refrigerator or similar appliance on the Sabbath and other holidays without violating Jewish law. In accordance with the invention, the Holiday/Sabbath Mode and Normal Mode are established in the same manner as described in the aforementioned Bloch et al patent. However, for the present invention, in the Holiday/Sabbath Mode, instead of prohibiting all current change, the system establishes a repetitive on-off cycle based on optimizing the effectiveness of refrigerator operation. More specifically, the controller of the invention is inserted in the a.c. power line for a refrigerator to selectively interrupt voltage application/current flow to the refrigerator in a Sabbath/Holiday Mode. In that mode the system controls refrigerator operation with repetitive time cycles having alternating "on" and "off" portions that are displayed to the user by, for example, different color indicator lights, only one of which may be actuated at any time. The cycle portions determine when the refrigerator door may properly be opened and when it should be closed without causing current flow change. These cycles, and their duty cycles, exist irrespective of any action by the user. It is up to the user to follow the dictates of the indicator lights; if he/she does not do so properly, a religious law violation might be committed, but it has no effect on system operation.

Other aspects and advantages of the present invention will become apparent to those skilled in the art on reviewing the drawings referenced below and reading the following detailed description.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein like components are designated by like reference numerals.

FIGS. 2-16 illustrate respective parts of an electrical schematic diagram of the controller of the present invention wherein:

FIG. 2 illustrates a microcontroller circuit;
FIG. 3 illustrates a power supply circuit;
FIG. 4 illustrates voltage regulator circuit;
FIG. 5 illustrates a delayed start-up circuit;
FIG. 6 illustrates an oscillator circuit;
FIG. 7 illustrates a thermistor circuit;
FIGS. 8A, 8B and 8C illustrate respective manually actuable switch circuits;
FIG. 9 illustrates a relay control circuit;
FIG. 10 illustrates a timing signal circuit;
FIG. 11 illustrates a relay crossover circuit;
FIG. 12 illustrates an LCD driver circuit;
FIG. 13 illustrates an LCD backlight circuit;
FIG. 14 illustrates a green LED circuit;
FIG. 15 illustrates a red LED circuit; and
FIG. 16 illustrates an LED module connector circuit.

DETAILED DESCRIPTION OF THE INVENTION

Figure 17:
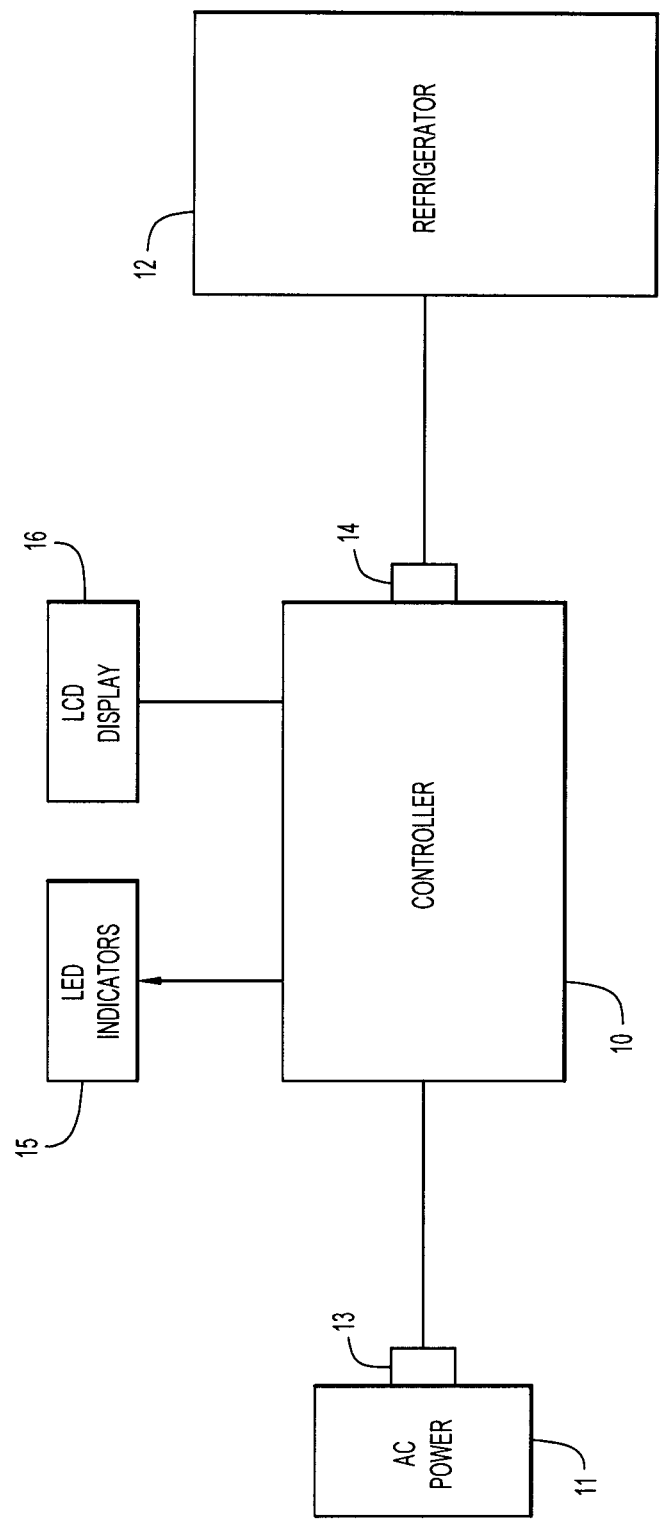
FIG. 17 is a functional block diagram showing the controller of the present invention connected between an a.c. power outlet and a refrigerator.

Referring initially to FIG. 17, a controller 10 of the present invention is, in use, connected in the a.c. convenience power line between a wall socket 11 and the appliance 12 which, in this example, is a refrigerator. The controller has its own power wire and plug 13 that is insertable into a conventional a.c. wall socket, and the refrigerator power plug 14 is insertable into a similar socket provided in controller 10. If the controller is supplied as part of the original equipment of the refrigerator, plug 14 and its connection wire would be eliminated, replaced by internal wiring in the refrigerator. Either way, controller 10 is connected to be able to selectively interrupt application of operating voltage to, and passage of current through, the refrigerator 12 at selected times determined by the controller. Indicators 15 and display 16 are associated with the controller and are typically mounted on its housing. Indicators 15 are preferably two different colored LED lamps that are positioned to be visible to the user of the refrigerator to indicate when, from a religious law perspective, it is safe to open the refrigerator door (e.g., a green indicator lamp is lit) and when it is not (e.g., a red indicator lamp is lit) as determined by controller 10 in the manner described below. Display 16 is typically an LCD alphanumeric display screen which, in conjunction with switches described herein, permits a user of appliance 12 to enter data into the system as described hereinbelow.

In accordance with the present invention, a Holiday/Sabbath Mode and a Normal Mode are established in the controller in the same manner as described in the aforementioned Bloch et al patent. However, for purposes of the present invention, in the Holiday/Sabbath Mode, instead of preventing any current change in a circuit, controller 10 establishes a repetitive on-off cycle based on optimizing the effectiveness of refrigerator operation. Specifically, during the "on" cycle portion the refrigerator operates in its conventional manner whereby its compressor operation times are under thermostatic control and dependent on the temperature inside the refrigerator, just as the refrigerator would operate in the Normal Mode. During the "off" portion of the cycle all current flow to the refrigerator and its components is inhibited, irrespective of any condition such as opening the door, temperature change inside the refrigerator, etc. In the disclosed embodiment, the cycle period (i.e., the total time for completing one "on" cycle portion plus one "off" cycle portion) and duty cycle (i.e., the percentage of "on" time within a cycle period) remain constant. As an example, consider a fifteen minute cycle period or duration in which the "on" portion of the cycle (when current is flowing) may be 8.5 minutes and the "off" portion (when current flow is inhibited) may be 6.5 minutes (i.e., a duty cycle of 6.5/15, or 56.7%). During the "off" portion of the cycle the user may safely open the refrigerator door without violating Jewish law since any resulting change of temperature will not affect when current is once again supplied to the compressor motor and other components. In other words, the connection permitting current flow will be restored at the start of the "on" portion of the cycle irrespective of whether or not, and for how long, the door may have been opened during the "off" portion of the cycle. During the "on" cycle portion the user is instructed by indicators 15 to not open the refrigerator door. During the "off" portion of the cycle the user is warned at a predetermined time (e.g., thirty seconds, sixty seconds, etc.) prior to the start of the "on" cycle portion that the door, if open, needs to be closed because of the impending "on" cycle portion. Indicators 15, typically red and green LED lamps, are provided to inform the user when the "off" and "on" portions, respectively, of the cycle are in effect and, therefore, when the door may and may not be opened. The green lamp when lit indicates it is safe to open the door (i.e., during the "off" cycle portion); the red lamp when lit indicates the door should not be opened (i.e., during the "on" cycle portion). In the disclosed embodiment, the green and/or red lamps are caused to flash at the ends of their cycle portions to warn the user of impending cycle portion changes. Alternatively, impending changes from one cycle portion to another may be indicated by actuating a third lamp, for example an amber lamp. In either case, the user is warned that an open door should be closed within a specific time (e.g., thirty or sixty seconds) because of an impending cycle portion change.

The cycle period and duty cycle may be determined in advance by the manufacturer of the control unit based on observation of existing operating standards of different model refrigerators. The period and duty cycle may also be adjustable by the user based on user experience, whereby the initial pre-setting may be changed to accommodate experiential data with a view toward optimizing food safety and preservation. Two, three or more different alternatively selective cycles (i.e., cycles with different periods and duty cycles) may be made available to the user, with either or both of the cycle period and duty cycle being manually adjustable. The user may also change these parameters based on personal preferences and situations, such as desired food temperatures, amount of food in the refrigerator, etc. Such changes would of course be made by the user during the Normal Mode (i.e., non-Holiday/Sabbath times).

In general, the cycle periods and duty cycles are chosen with conservative food-safe considerations in mind. Further, although the description above contemplates repetitively constant cycle periods and duty cycles, it is within the scope of the invention to permit automatic or scheduled variations of those parameters as a function of time of day, volume of contents sensed inside the refrigerator, and other parameters as appropriate, as long as the variation is not effected as a result of opening the refrigerator door or other manually initiated action during the holiday/Sabbath mode.

As described, the invention protects against the possibility of user action activating or de-activating electric current during the Sabbath and holidays by completely disconnecting the refrigerator from the electricity at regular intervals throughout those days. The on/off cycles maintain the food inside the refrigerator at proper temperatures while also allowing the user refrigerator access time.

Example: Assume the aforementioned holiday mode cycle with a period of fifteen minutes and a duty cycle of 56.7% (i.e., 8.5 minutes "on" portion, 6.5 minutes "off" portion). The refrigerator will run as normal for 8.5 minutes of each cycle to keep the food cool under thermostat control, and will then shut down entirely for 6.5 minutes, giving the user time to access the refrigerator contents. The cycle repeats continuously every fifteen minutes throughout the holiday/Sabbath time period. For the convenience of the user, the "off" portion may begin, and the user will have access, at known specific times, such as the start of each quarter hour.

To summarize, during the holiday/Sabbath mode, during the "off" portion of each cycle when power to the refrigerator is turned off, the green lamp on the display is steadily illuminated, indicating that the refrigerator may be used without affecting any electrical circuits inside. When power to the refrigerator is restored, the red lamp is steadily illuminated, indicating that the restricted access time is in effect. As noted above, the lamps are illuminated in a periodically flashing manner prior to a cycle portion change to warn the user that the cycle portion will change within the next thirty or sixty seconds.

Example: When the green light is steadily illuminated, indicating that the refrigerator is powered off, the red lamp may begin flashing sixty seconds before the refrigerator turns on, warning the user that only a short amount of access time is left for the current cycle. Thirty seconds before the "on" cycle portion is to begin the lamp may start flashing at a faster rate, and at ten seconds even faster, indicating an urgency in the need to quickly close the refrigerator door.

Figure 1A:
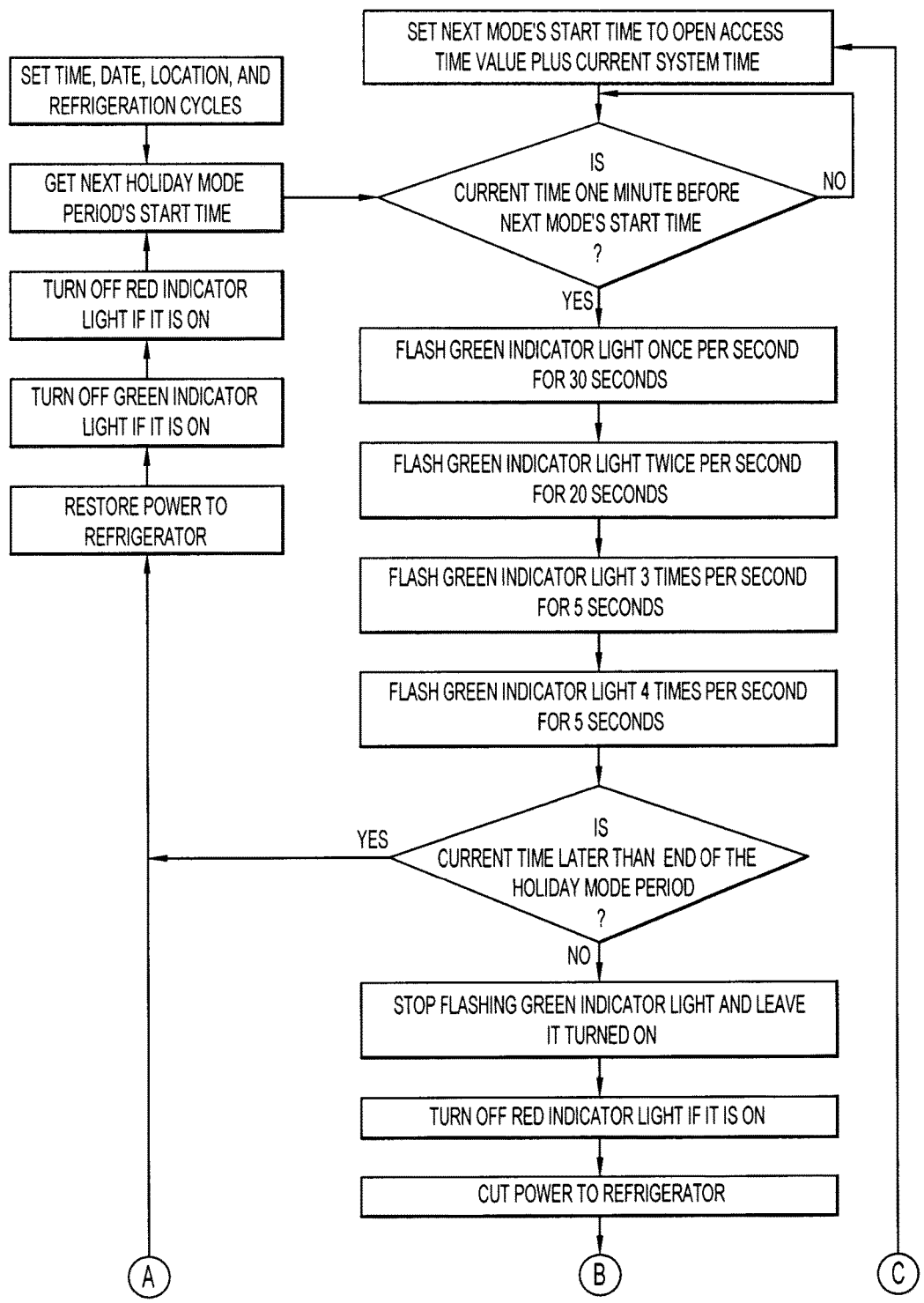
FIGS. 1A and 1B illustrate a software flow diagram representing operation of a preferred embodiment of the controller of the present invention.
Figure 1B:
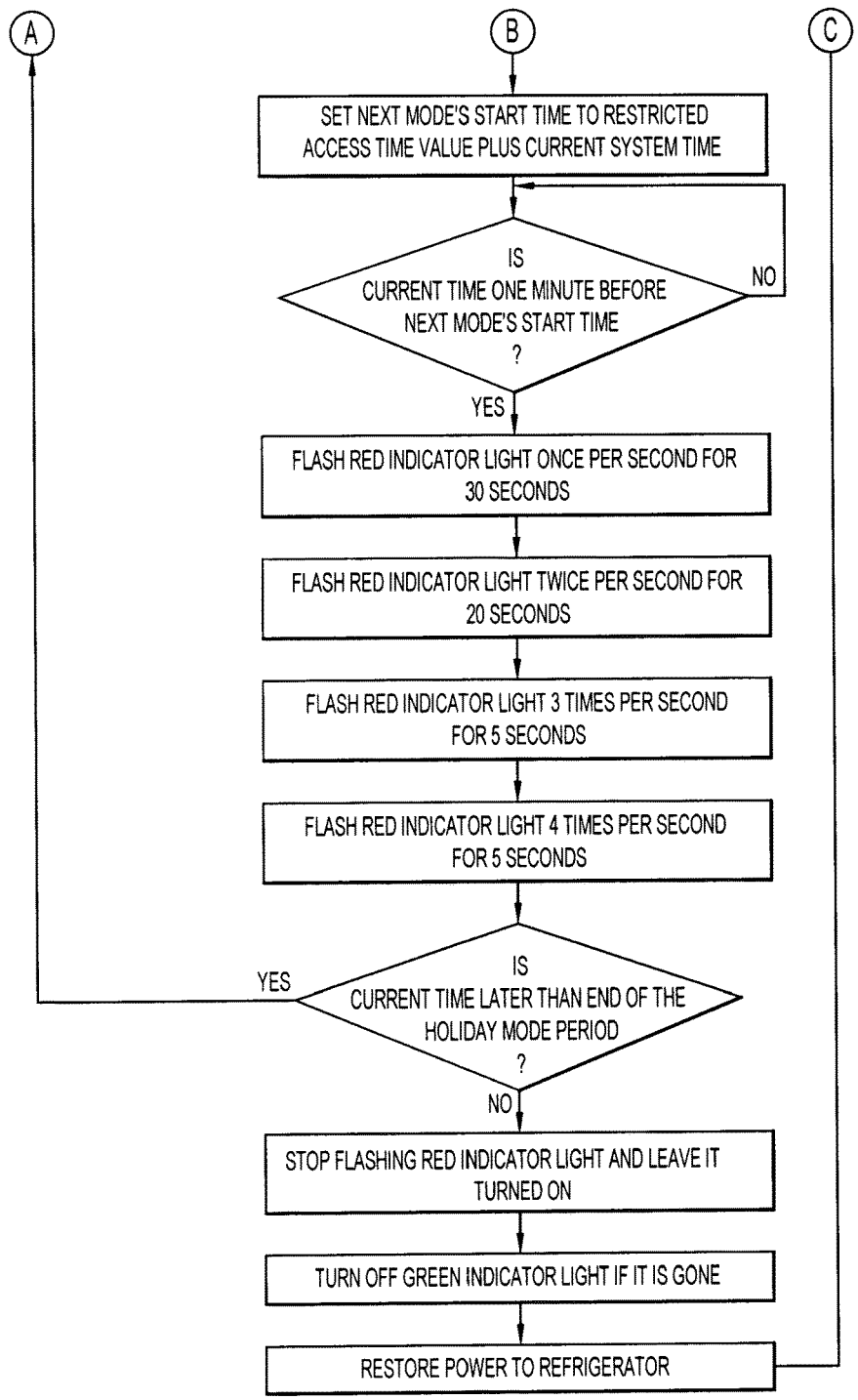
Figure 2:
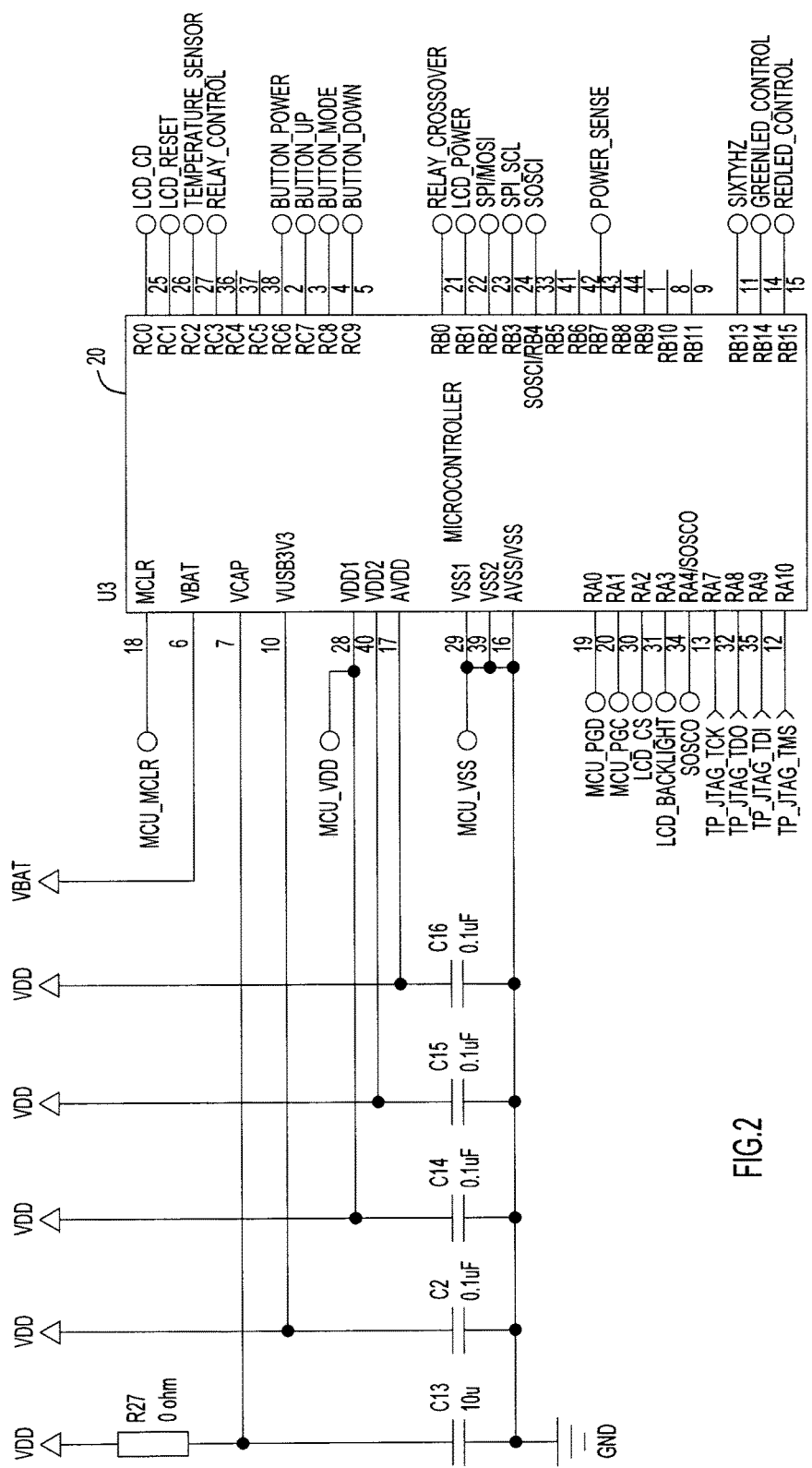
Figure 3:
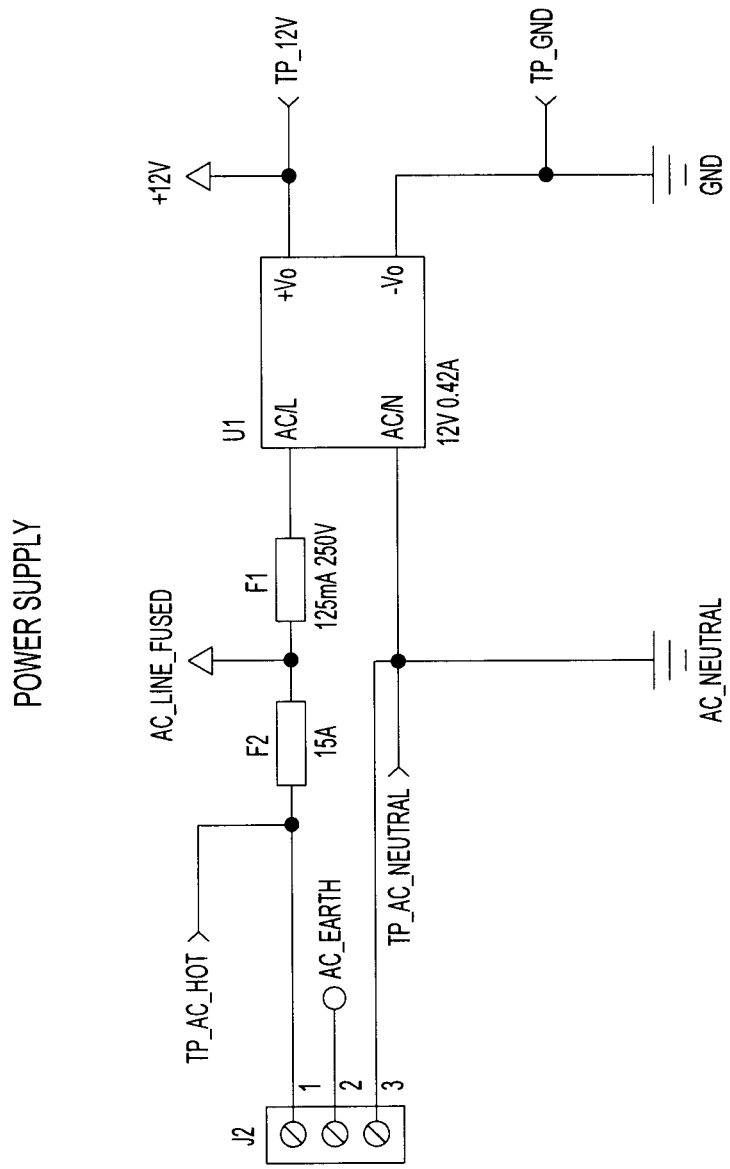
Figure 4:
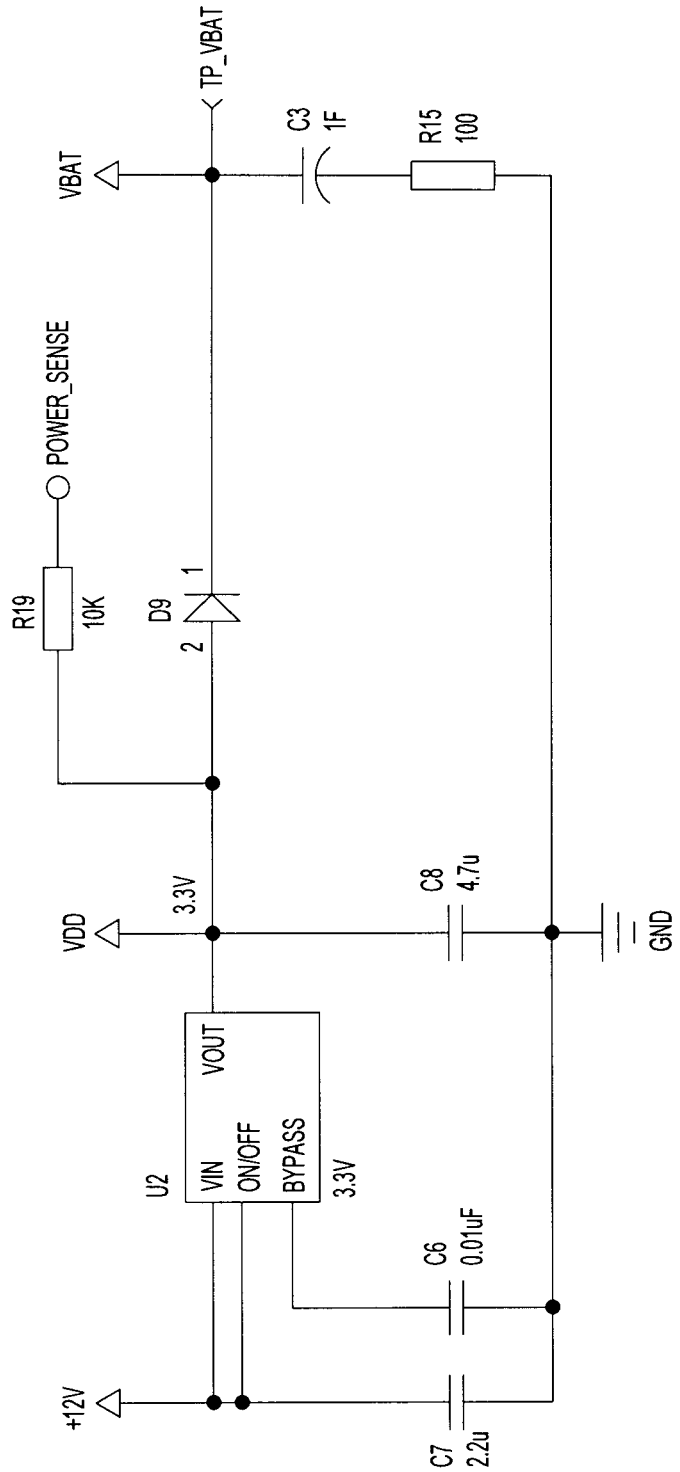
Figure 5:
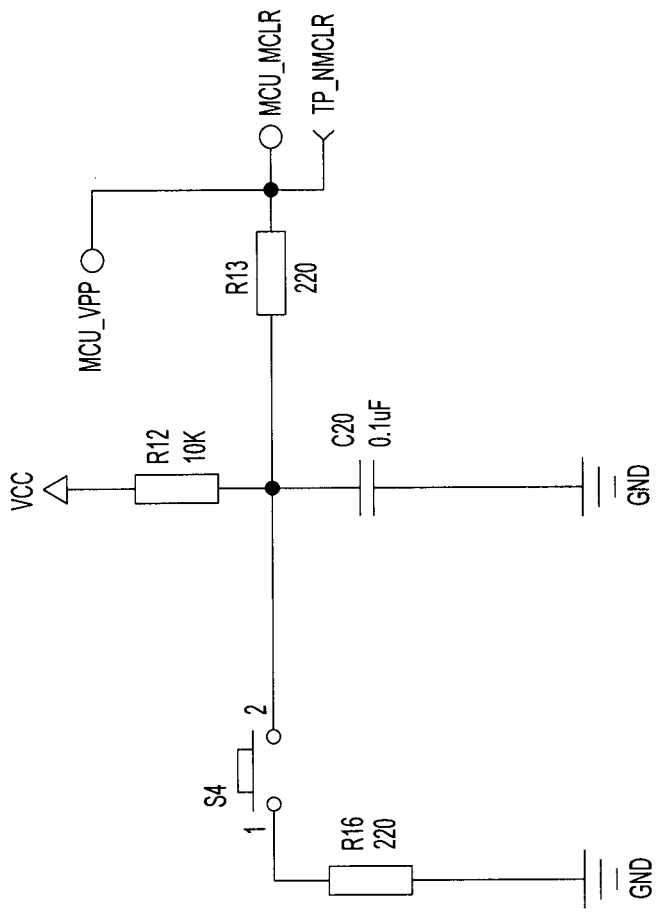
Figure 7:
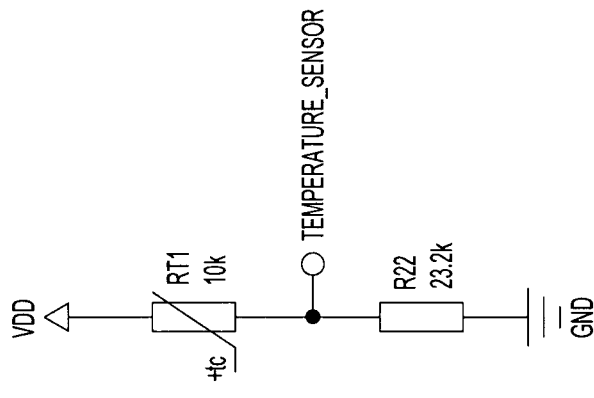
Figure 6:
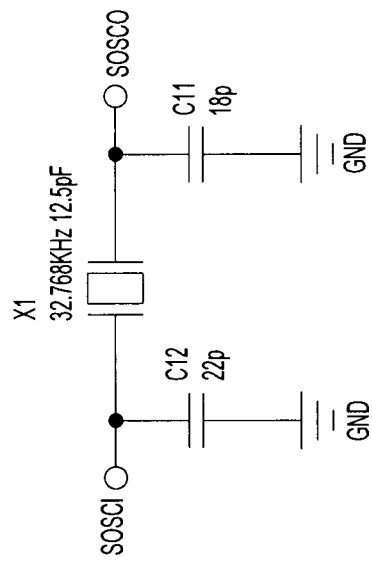
Figure 12:
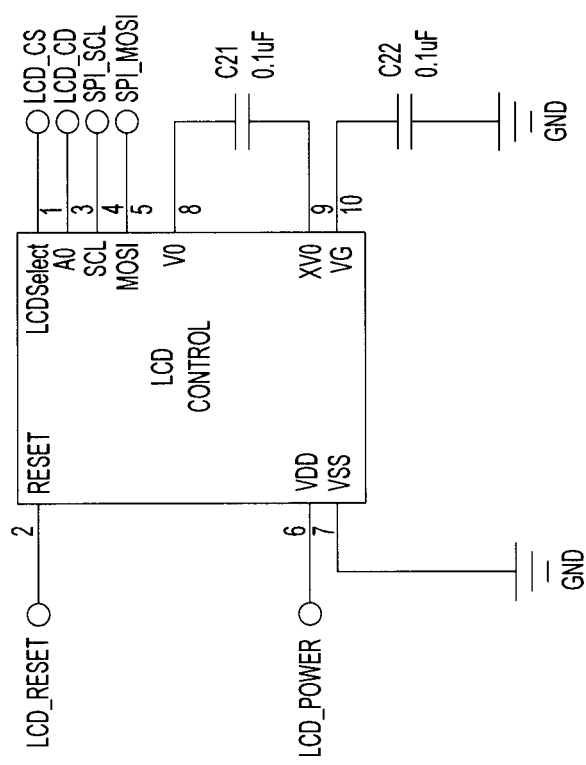
Figure 13:
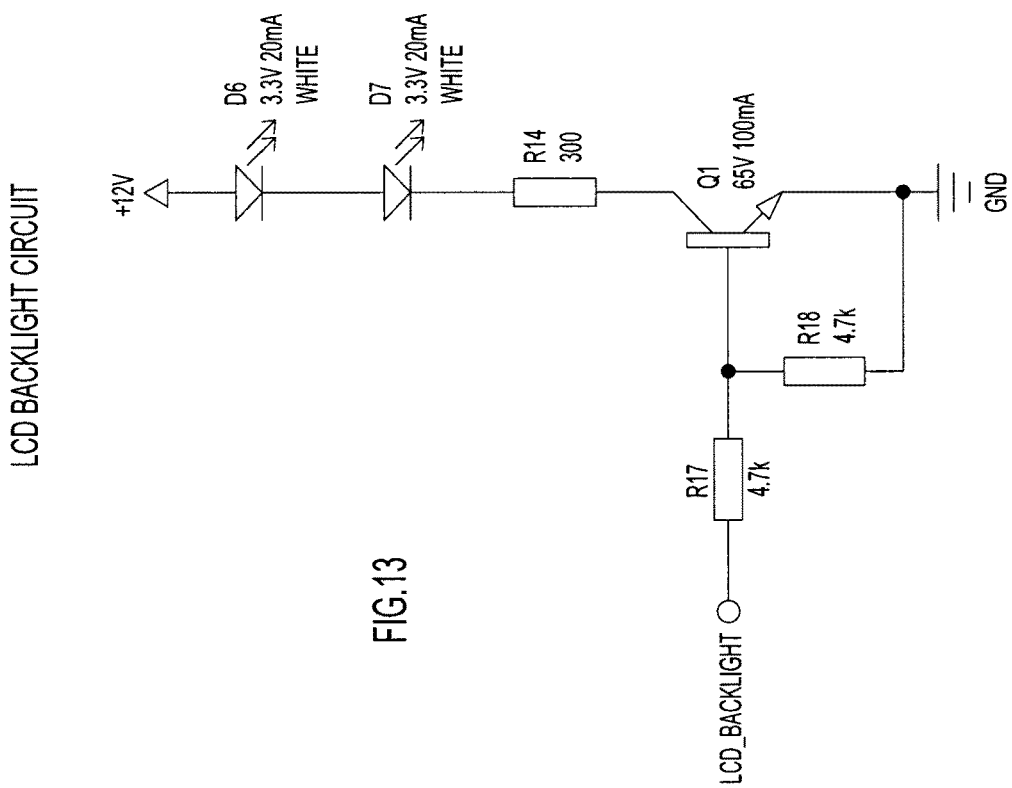
Figure 14:
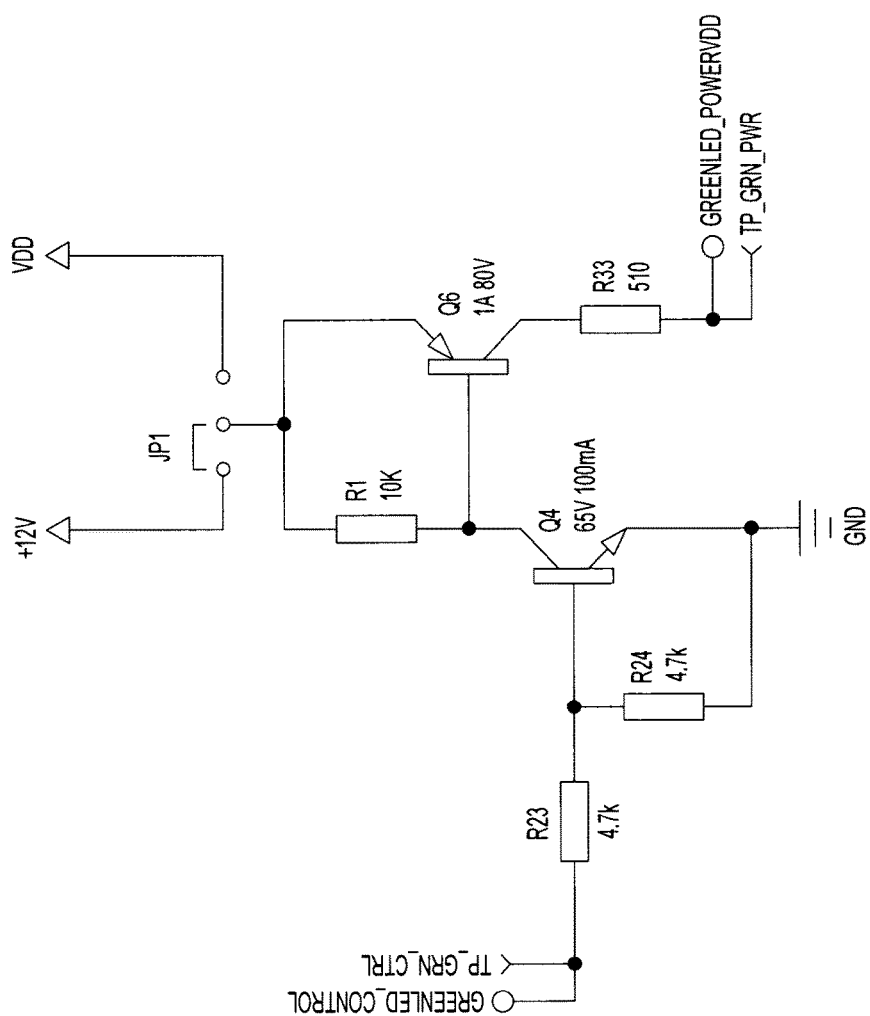
Figure 15:
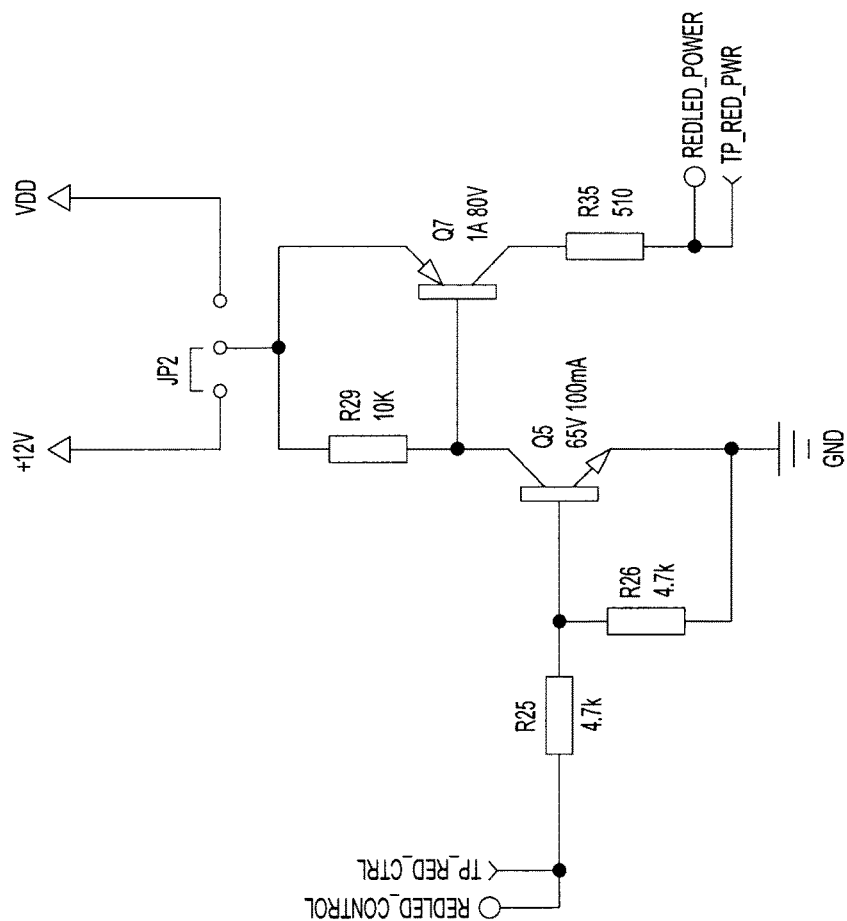
Figure 16:
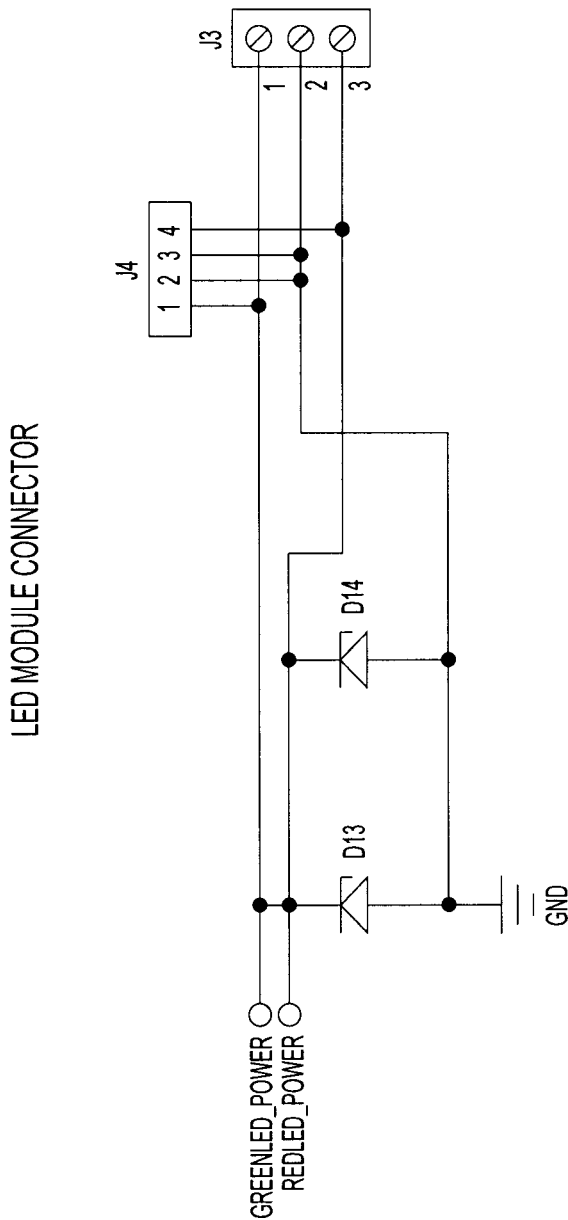

The operation described above is effected by the software graphically illustrated in the flow chart in FIGS. 1A and 1B and embodied in the microcontroller 20 illustrated in FIG. 2 which may be model PIC24FJ128GB204 manufactured by Microchip Technology Inc. The microcontroller software (FIGS. 1A and 1B) controls the various other circuit portions illustrated in FIGS. 3-16. It will be noted that signal lines in FIGS. 2-16 bear like names throughout these figures to indicate electrical connections between the terminals of the various components in the different figures. The components of the overall circuit include the system power supply illustrated in FIG. 3, the voltage regulator illustrated in FIG. 4, the 32.768 KHz system clock illustrated in FIG. 6, the thermistor temperature sensor circuit of FIG. 7, the menu button switch circuits of FIGS. 8A, 8B and 8C, the LCD display controller circuit of FIG. 12 which, for example may be an ST7567 Dot Matrix LCD Controller/Driver manufactured by Sitronix Technology Corp., the LCD display backlight circuit of FIG. 13, the green and red LED lamp actuator circuits of FIGS. 14 and 15, respectively, and the LED module connector of FIG. 16 The "Delayed Start-Up & Reset Button circuit" illustrated in FIG. 5 includes a reset button switch that clears the system memory and resets it to the beginning of the program; however, it does not clear backed up data or the current time if that time has been set. The delayed startup keeps the device in a reset state for a brief period of time so that if power is not yet stabilized, the device does not start up and power down repeatedly.

Figure 9:
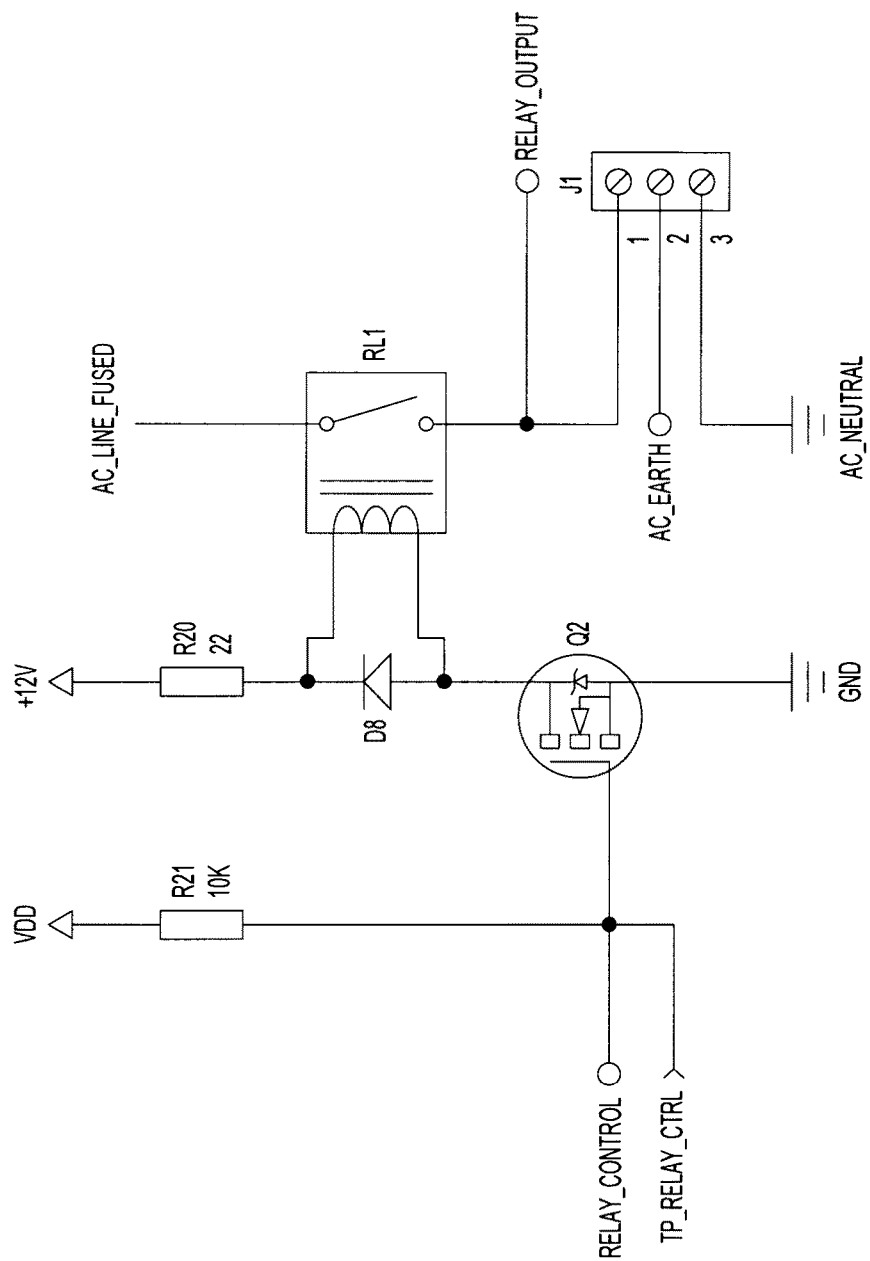
Figure 10:
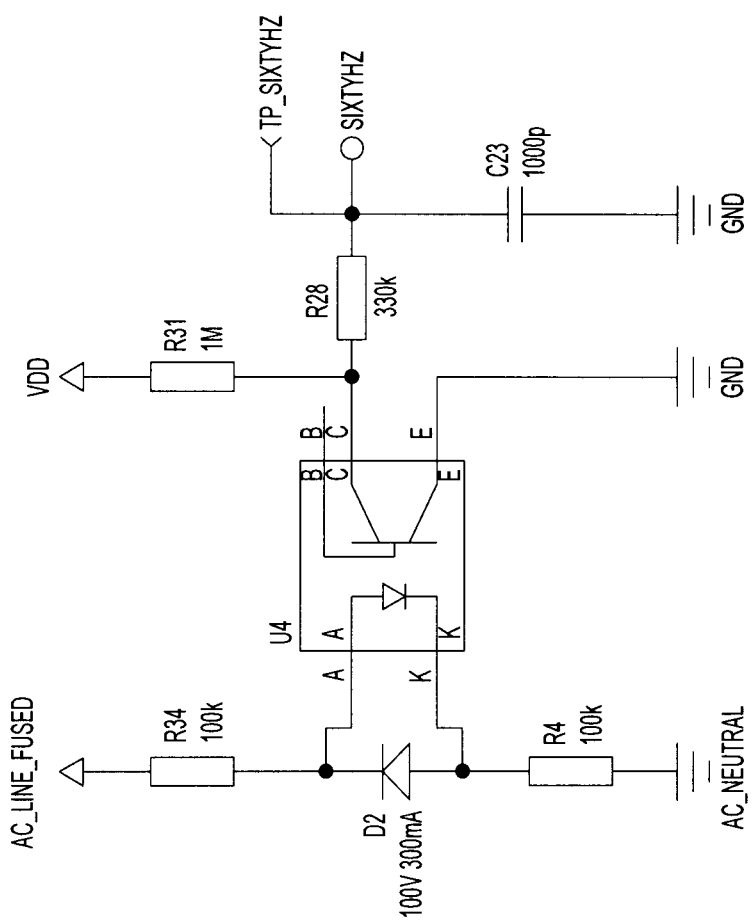
Figure 11:
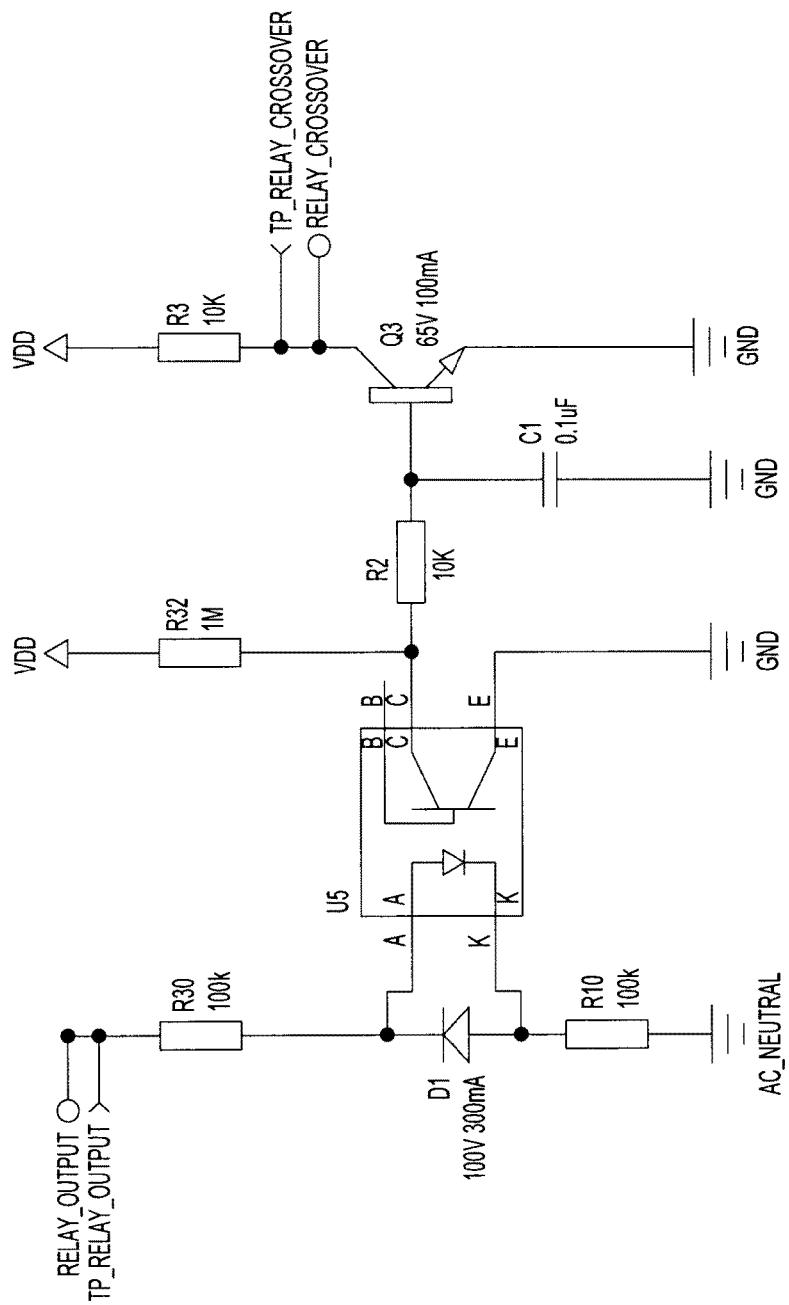

The Relay Circuit of FIG. 9 includes relay RL1. The output signal from the relay connects and disconnects the refrigerator "hot" a.c. lead to the a.c. input 11 (FIG. 17) based on a control signal sent from the microcontroller 20. When the "RELAY CONTROL" pin at microcontroller 20 is at high (e.g., 3.3 volts), MOSFET transistor Q2 (FIG. 9) allows current to flow through the coil of relay RL1 to close the relay contacts. Transistor Q2 may be, for example a DMN6140L MOSFET MANUFACTURED BY Diodes Incorporated. The "Filtered Relay Crossover" circuit in FIG. 11 includes an opto-isolator transistor such as Fairchild model 4N35S, and is used to detect an error at the relay output; it provides a high or low output voltage in response to the current state of the relay output voltage. The relay signal is filtered in order to provide a steady signal rather than an alternating 60 Hz signal when the relay contacts are closed. The 60 Hz time signal is similarly filtered in the circuit of FIG. 10.

In controller operation as represented in the flow chart in FIGS. 1A and 1B, after the current time, date, and geographical location of the controller is entered, the system calculates when Sabbath or a holiday will arrive. Approximately one and one-half hours before the Sabbath/Holiday starting time, at the top of the hour (e.g., 6:00 p.m.), the controller exits the Normal mode and activates the Sabbath/Holiday Mode to run the refrigerator according to the timed cycles throughout the duration of that Mode. The cycle starts at the "off" or green portion of the cycle wherein power to the refrigerator is cut off and access to the refrigerator is permitted.

As noted above, in order to maintain food safety, appropriate cycle period lengths and duty cycle percentages are selected. This ensures convenient access by the user to the refrigerator during the Sabbath or holiday, while also assuring that the temperature in the food storage areas remain below 40° F. per USDA and FDA recommendations.

In order to determine which selectable cycle period and duty cycle are best for a particular model of refrigerator, the user may test the refrigerator with different cycle times, preferably for a minimum of 24 hours, at times well before the Sabbath or holiday.

In the preferred embodiment the system will not operate in the Sabbath/Holiday Mode unless and until the time, date, location, and cycle times have been entered. In such case the refrigerator remains powered as normal without the indicator actuations.

The controller 10 of the present invention may be provided as original equipment with a refrigerator or installed as an aftermarket unit. When used as an aftermarket unit, the controller is installed as described above in connection with FIG. 2 by plugging the refrigerator power cord plug 14 into controller 10 and plugging the controller power cord plug 13 into a wall outlet so that all current must pass through the controller and is delivered or not to the refrigerator according to the conditions described above. The controller 10 is typically mounted on a wall adjacent the refrigerator so that it can be easily accessed by the user to enter the initial data (time, date, location, and cycle times), and so that the indicator lamps on the unit can be easily seen. If the controller is provided as original equipment with the refrigerator, the controller is electrically connected to interrupt power in the same manner but only one power cord and plug us required.

When the controller starts up for the first time, the indicator lights and text on its LCD display will all flash on and off. This flashing warns the user that the device needs to be setup. From top to bottom, the time, date, location, and cycle preset number are displayed on a screen. The flashing text indicates which information needs to be set.

If the system loses power for an extended period such as a several hours or days, a battery backup will automatically reset the correct information when the power comes back on. If the power is off for more than, for example, 72 hours, the time and date may need to be entered again, but all other information will be saved.

To set the time and geographic zone at which the controller is located, the user is instructed to follow the following sequence of steps in setting up the controller 10:

Press the SET button once to power up the screen and once more to enter the main menu.

Press SET again to enter the Time menu.

The hour will be highlighted; press the up/down buttons to select the hour and press the SET button to confirm the setting and highlight the minutes.

Use the arrows to scroll to the correct minute; and press SET.

The screen will now display the time zones.

Use the arrows to scroll to your applicable time zone and press SET.

After the time is set press the up arrow to bring up the Date menu.

Press SET again to set the date.

Press the up/down arrows to select the year and press the SET button to confirm the selection and move on to the next item.

Repeat the process for the month and day.

After the date is set press the up arrow to show the Location menu.

Use the up/down arrows to select State and press SET to confirm the selection.

Use the up/down arrows to select City and press SET to confirm the selection

In order to select cycle times, the user chooses from the modes in Table I mode that works best with his/her refrigerator. Typically, each preset mode would be tried during a week for a minimum of 24 hours to see which works best.

TABLE I

|  | Green ("Off") | Red ("On") | Total cycle time: |
| --- | --- | --- | --- |
| PRESET 1 | 3.25 Minutes | 4.25 Minutes | 7.5 minutes |
| PRESET 2 | 6.5 Minutes | 8.5 Minutes | 15 minutes |
| PRESET 3 | 12 Minutes | 18 Minutes | 30 minutes |

Note:
All cycles typically start at the top of the hour in order to give access at the beginning of each quarter hour or half hour throughout Sabbath or holiday.
The duty cycle for presets 1 and 2 is 56.7%; for preset 3 it is 60%. Duty cycles in the range of 50% to 65% are most typical for assuring food safety and freshness, depending on the volume of food in the compartment.

In order to accommodate persons starting the Sabbath/holiday early, the system may be set to automatically start the Sabbath/Holiday Mode 1½ hours (or some other time) before sundown or other start of the Sabbath/holiday.

The invention as described herein provides a system whereby observant Jews can conveniently use a refrigerator or similar appliance without violating Jewish law. In a Sabbath/Holiday Mode the system controls refrigerator operation with repetitive time cycles having alternating "on" and "off" portions that are displayed to the user, preferably by means of different color indicator lights. The cycles exist irrespective of anything done by the user and determine when the refrigerator door may properly be opened and when it should be closed. If the user does not follow the dictates of the indicator lights a violation of religious law might be committed, but it has no effect on system operation.

The cycle duration and duty cycle are determined in advance, and two, three or more different alternative sets of times may be provided as options and can be manually selected or adjusted to individually customize the schedule.

Although the preferred embodiment as disclosed above does not provide for adjusting the cycle period (i.e., length) and duty cycle percentages based on sensed temperature changes, or volume of food in the refrigerator, it is within the scope of the invention to provide for this capability.

It will be appreciated that the controller has use for applications other than controlling a refrigerator or freezer, for example with HVAC systems used to control the temperature in a closed environment. If a door to that environment is opened, outside air enters the environment and affects the temperature sensed therein which, in turn, changes the operating state of the HVAC system and the current flow therethrough. Establishing the operation control cycles as described herein will permit indicators to inform residents when it is safe to open the door to the house or other environment without violating religious laws regarding change of electrical circuit operation.

The foregoing descriptions of specific embodiments of the smart timer of the present invention have been presented for purposes of illustration and description. They are not intended to be exhaustive or to limit the invention and method of use to the precise forms disclosed. Obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstances may suggest or render expedient, but is intended to cover the application or implementation without departing from the spirit or scope of the claims of the present invention. Although specific terms are employed herein, they are used in a generic and descriptive sense only and not for purposes of limitation.

What is claimed is:

1. A controller for enabling observant Jews to use, without violating Jewish law, an electrical appliance of the type having a compartment with a door and that normally draws current or not as a function of the temperature sensed by a temperature sensor within the compartment to maintain that temperature within a prescribed temperature range, wherein said controller is electrically connected between the appliance and an a.c. power source and comprises:

a processor storing date data, time data, geographic location data, data and settings corresponding to a holiday mode, and data and settings corresponding to a normal mode;

a visual indicator having first and second visible states;

said processor configured and programmed to automatically alternate the appliance between the normal mode and the holiday mode in response to date, time and geographic location data stored in the processor, said processor in said holiday mode establishing repetitively constant operating cycles of constant frequency throughout said holiday mode, said operating cycles each having an "on" portion of constant duration throughout said holiday mode during which current is permitted to flow through said appliance and modify the temperature in the compartment in response to the temperature sensed by the temperature sensor, and an "off" portion of constant duration throughout said holiday mode during which current is prevented from flowing through said appliance, the duration of the "on" portion of said cycle being sufficient to maintain the temperature in the compartment within the prescribed temperature range;

said processor further configured and programmed to activate said visual indicator in said first state during the "on" portion of the operating cycle and in said second state during the "off" portion of the operating cycle, whereby said visual indicator in said first state serves to advise a user of the appliance to not open the compartment door, and in said second state that the compartment door may be opened.

2. The controller of claim 1 wherein said visual indicator comprises first and second lamps of different colors, said first lamp being actuated in said first state, said second lamp being actuated in said second state.

3. The controller of claim 2 wherein said processor is configured and programmed to cause one of said lamps to flash on and off for a terminal part of said "off" portion of the cycle.

4. The controller of claim 3 wherein said first lamp is a red LED lamp, and wherein said second lamp is a green LED lamp.

5. The controller of claim 1 wherein said processor is programmed and configured to permit a user of the appliance to selectively change either or both of the time duration and duty cycle of said repeating operating cycle during said normal mode.

6. The controller of claim 1 wherein said appliance is a refrigerator and said compartment is a food storage compartment.

7. A method for enabling observant Jews to use, without violating Jewish law, an electrical appliance of the type having a compartment with a door and that normally draws current or not as a function of the temperature within the compartment to maintain that temperature within a prescribed temperature range, said method comprising the steps of:

storing in a database date data, time data, geographic location data, data and settings corresponding to holiday operating mode, and data and settings corresponding to a normal operating mode;

in response to said stored data and settings, automatically alternately establishing said normal and holiday operating modes;

throughout said normal operating mode, permitting current flow through said appliance at any time as determined by the temperature within the appliance compartment;

establishing throughout said holiday operating mode repetitive fixed frequency time cycles, each time cycle having "on" and "off" portions wherein the "on" portion has the same first duration in each cycle and the "off" portion has the same second duration in each cycle;

throughout said "on" cycle portion permitting current flow through said appliance as determined by the temperature within the appliance compartment;

throughout said "off" cycle portion inhibiting current flow through said appliance irrespective of temperature changes in said compartment;

providing a respective visible indications for the occurrence of each of said "on" and "off" cycle portions; and providing a further visible indication different from said respective visual indications for a predetermined time interval prior to all transitions from said "off" cycle portion to said "on" cycle portion.

8. The method of claim 7 wherein the step of providing a visible indication includes actuating a first indicator lamp during said first cycle portion.

9. The method of claim 8 wherein the step of providing a visible indication further includes actuating a second indicator lamp during said second cycle portion.

10. The method of claim 8 wherein said further visible indication includes flashing said first indicator lamp on and off during a terminal part of the second cycle portion.

11. The method of claim 7 wherein said appliance is a refrigerator and said compartment is a food storage compartment, and wherein the current flow through said appliance activates a compressor motor.

12. A method of controlling operation of an electrical appliance of the type wherein current flow in a first operating mode is interrupted and resumed at times determined at least in part by use of the appliance, said method comprising the steps of:

storing in a database date data, time data, geographic location data, data and settings corresponding to a second operating mode wherein current flow is independent of appliance use;

automatically initiating and terminating said second operating mode in accordance with the stored data and settings;

establishing throughout said second operating mode repetitive fixed frequency time cycles, each time cycle having "on" and "off" portions wherein the "on" portion has the same first duration in each cycle and the "off" portion has the same second duration in each cycle;

permitting current flow through said appliance during said "on" portion at times determined at least in part by temperature sensed in the appliance and inhibiting current flow through said appliance during said "off" portion;

providing a first visible indication during said "on" cycle portion and a second visible indication during said "off" cycle portion.

* * * * *